Nov. 15, 1949   A. P. DUFOUR   2,488,177
DEVICE FOR TAKING COMPOSITE MOTION PICTURES
Filed Jan. 9, 1945

INVENTOR:
Achille Pierre Dufour
By Otto Munk
his ATTY.

Patented Nov. 15, 1949

2,488,177

UNITED STATES PATENT OFFICE 2,488,177

DEVICE FOR TAKING COMPOSITE MOTION PICTURES

Achille Pierre Dufour, Paris, France

Application January 9, 1945, Serial No. 571,971
In France June 20, 1942

Section 1, Public Law 690, August 8, 1946
Patent expires June 20, 1962

3 Claims. (Cl. 88—16)

The present invention relates to a unitary optical appliance adapted to be associated with a camera for taking motion pictures from a composite scene comprising a real back-ground and real movable objects or actors, and a small scale model, or the like, intended to give the illusion of a close-up.

The invention has for its object to provide a unitary optical appliance adapted to form from the real large sized sections of the scene a real, inverted, small sized image, focused in the plane of a small sized model having opaque portions adapted to partially mask said image and to represent the close-up portions of the scene on the one hand and transparent portions adapted to expose the unmasked portions of the image on the other hand, so that a motion picture camera can be focused on said composite subject so as to take a view thereof on a film.

The device for carrying out the invention, which is adapted to be placed in front of the objective of a camera, comprises in combination an auxiliary objective, adapted to form a real image of the back-ground and of the movable subjects in the plane of a partially transparent or cut out model of small size, and an optical field magnifier adapted to concentrate the incident beam of light into the field of the objective of the camera.

The invention permits of reproducing in a very simple manner, with good clearness and whilst maintaining a normal aperture for the objective of the camera, the back-ground and the subjects as well as the model, which appears as a scenery of large dimension, forming part of the filmed scene.

The apparatus is preferably provided with means for illuminating the face of the model which is turned towards the objective of the camera; for back-lighting effects, the face of the model which is turned towards the back-ground may also be illuminated.

The above mentioned optical field magnifier may be located in the vicinity of the model, in front or behind the latter, but it is preferably divided into two elements, located on either side of the model.

The invention will be more clearly understood with reference to the appended drawing, in which.

Figure 3:
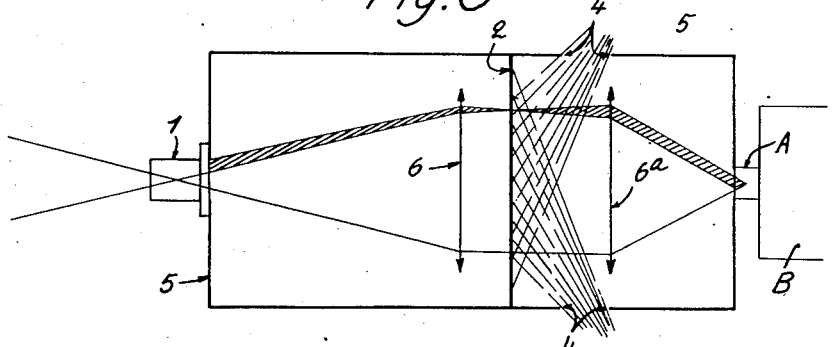

Referring to the drawing, 1 denotes a photographic objective (which can vary from a simple convergent lens to the most complex anastigmatic lens) and which gives of the scene to be filmed a real inverted image, focused in the plane of model 2, which is to form a part of the scene. Said model which is arranged in an inverted position, may consist of a simple photograph (cut out print, positive on glass, more or less gouached at the back, etc.), which is illuminated by means of suitable luminous sources 3 or by external light passing through apertures 4 (Fig. 3) formed in the box 5 enclosing the apparatus.

Figure 1:
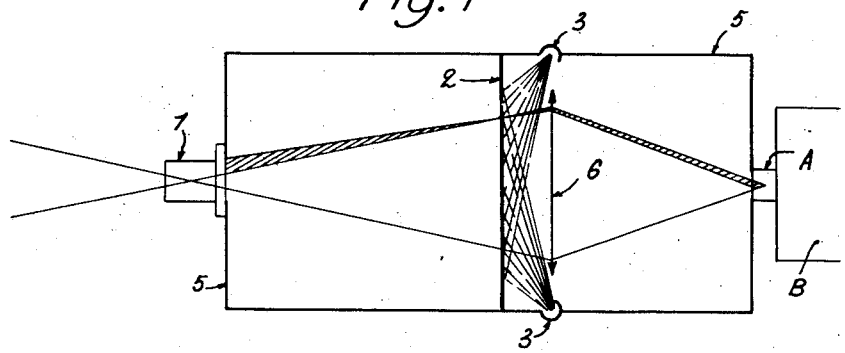
Fig. 1 shows an embodiment of the device according to the invention.
Figure 2:
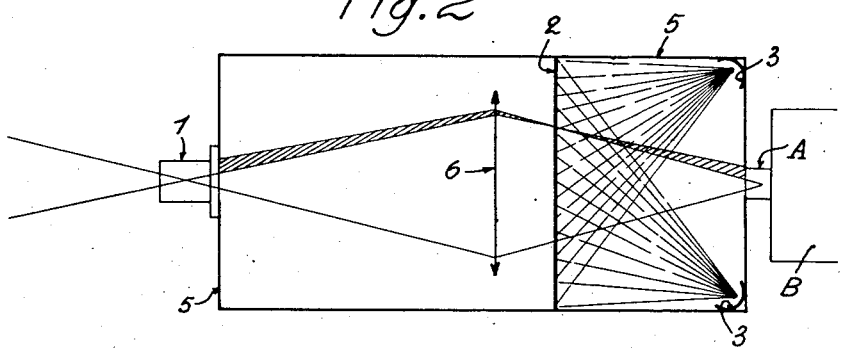
Figs. 2 and 3 show modifications of the invention.

A field lens 6 placed in the vicinity of the model, is of such a curvature that it concentrates the beam of light through the objective A of the camera B, thus increasing the field for a given length of the apparatus. Lens 6 can be arranged in front of (Fig. 1) or behind (Fig. 2) model 2, or preferably two lenses 6, 6a can be arranged (Fig. 3) on either side of the model.

These lenses can be simple convergent glasses or perfectly corrected achromatic lenses. The objective A of camera B is an ordinary objective.

As the final image obtained on the film is a straight image, the film must be run through in reverse direction to its normal direction. This result can be obtained, either by turning the camera upside down, or by causing the mechanism of said camera to rotate in reverse direction to the normal direction, in which case, when the film is provided with a sound track, the position of the mask which defines the sound track must be inverted. These measures may be dispensed with, however, by adding to the apparatus a reversing optical system made of prisms, mirrors, or the like.

It may be advantageous or necessary to place in front of the normal objective A of camera B a convergent lens (not shown), similar to a portrait lens, for avoiding excessive protraction of the objective upon focusing.

As, in most cases, the model or the photograph used must be illuminated, the mounting must be devised accordingly, and the field lenses must be placed so as to allow said illumination.

Figure 4:
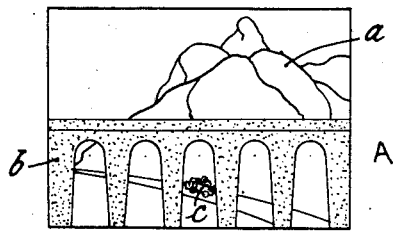
Fig. 4 shows the image obtained by means of said device.

The result obtained is visible in Fig. 4, in which *a* illustrates the image of the back-ground, *b* the image of the model, giving the illusion of a scenery of large dimension and *c* a real movable subject.

It will be noted that the invention is applicable only when the movable subject passes behind the model or at the side of the latter, and that said movable subject must never pass in front of the model although for certain perspective effects, impression may be given as if the movable subject, although located at the side of the model, would be in front of the latter.

Of course, the invention is not limited to the embodiments illustrated and described, which have been given only by way of example. The scope of the appended claims is to be the measure of the protection desired by Letters Patent.

Having now described my invention what I claim as new and desire to secure by Letters Patent is:

1. In combination with a motion picture camera, a unitary, portable, optical device for taking composite moving pictures of a real background and real moving objects and of an artificial foreground, which comprises a box substantially symmetrical around the optical axis of said camera, said box having in one end wall an aperture fitting over the objective of said camera, and in the opposite end wall an auxiliary objective centered on said optical axis; a two-dimensional plane opaque mask having cut-out transparent sections defining a foreground configuration represented on the face of said mask toward the camera, said mask being disposed within said box intermediate said camera and said auxiliary objective, said mask extending over the cross-sectional area of said box covered by the objective of said camera, in the focal plane of said auxiliary objective whereby said auxiliary objective forms in the plane of said mask an image of said background and moving objects placed outside said box at varying distances from said mask; sources of light on the periphery of said box for illuminating substantially the entire face of said mask toward said camera; means for concentrating the beam of light issuing from said auxiliary objective, said means comprising a field lens disposed between said mask and said camera, away from said mask and outside the path of light issuing from said sources of light; said mask being so disposed with respect to said camera that, upon operation of the latter, the film in said camera registers uninterruptedly a series of composite pictures each comprising an image of said foreground configuration and an image of said real background and real moving objects appearing in said cut-out sections.

2. In combination with a camera, a unitary, portable, optical device as claimed in claim 1 wherein said means for concentrating the beam of light issuing from said auxiliary objective further comprise a field lens disposed between said auxiliary objective and said mask.

3. In combination with a motion picture camera, a unitary, compact, optical device for taking composite moving pictures of a real background and real moving objects and of an artificial foreground, which comprises a box, said box having in one end wall an aperture fitting over the objective of said camera, and in the opposite end wall an auxiliary objective centered on the optical axis of said camera; a relatively thin opaque mask having transparent sections defining a foreground configuration represented on the face of said mask toward the camera, said mask being disposed within said box intermediate said camera and said auxiliary objective, said mask extending over the cross-sectional area of said box covered by the objective of said camera, in the focal plane of said auxiliary objective whereby said auxiliary objective forms on said mask an image of said background and moving objects placed outside said box at varying distances from said mask; lighting means on the periphery of said box for illuminating substantially the entire face of said mask toward said camera; means for concentrating the beam of light issuing from said auxiliary objective, said means comprising a field lens disposed between said mask and said camera, away from said mask and outside the path of light issuing from said lighting means; said mask being so disposed with respect to said camera that, upon operation of the latter, the film in said camera registers a series of composite pictures each comprising an image of said foreground configuration and an image of said real background and real moving objects appearing in said transparent sections.

ACHILLE PIERRE DUFOUR.

REFERENCES CITED

The following references are of record in the file of this patent:

UNITED STATES PATENTS

| Number | Name | Date |
|---|---|---|
| 804,624 | Saegmuller | Nov. 14, 1905 |
| 1,885,555 | Schwartz | Nov. 1, 1932 |
| 1,947,729 | Morrison | Feb. 20, 1934 |
| 1,955,850 | Hallett et al. | Apr. 24, 1934 |
| 2,146,386 | Todd | Feb. 7, 1939 |
| 2,174,931 | Terry et al. | Oct. 3, 1939 |
| 2,229,678 | Seaman | Jan. 28, 1941 |

FOREIGN PATENTS

| Number | Country | Date |
|---|---|---|
| 404,511 | Germany | Oct. 17, 1924 |
| 452,378 | Great Britain | Aug. 20, 1936 |